United States Patent [19]

Brown

[11] 4,408,466

[45] Oct. 11, 1983

[54] ELECTRICAL CIRCUIT AND METHOD OF OPERATING SUCH

[75] Inventor: Thomas W. Brown, Sterling, Ill.

[73] Assignee: General Electric Company, Fort Wayne, Ind.

[21] Appl. No.: 349,378

[22] Filed: Feb. 16, 1982

[51] Int. Cl.³ ............................................. F25B 27/00
[52] U.S. Cl. ..................................... 62/208; 62/323.4; 62/228.5
[58] Field of Search ..................... 62/208, 215, 323.4, 62/228 D, 226, 227, 229; 200/81 R, 81.4, 83 N, 83 L, 83 R; 307/118, 132 EA, 113, 115; 340/614, 626; 310/94; 236/75, 78 R, 78 A; 361/194, 154, 160, 178

[56] References Cited

U.S. PATENT DOCUMENTS

| | | | |
|---|---|---|---|
| 3,620,037 | 11/1971 | Young | 62/228 D X |
| 3,786,210 | 1/1974 | Byam | 200/81.4 |
| 4,256,973 | 3/1981 | Kochanski et al. | 307/118 |
| 4,263,928 | 4/1981 | Kobayashi et aL. | 361/154 X |
| 4,355,523 | 10/1982 | Shimada | 62/323.4 X |
| 4,356,705 | 11/1982 | Sutoh et al. | 62/323.4 X |

*Primary Examiner*—Albert J. Makay
*Assistant Examiner*—Harry Tanner
*Attorney, Agent, or Firm*—Joseph E. Papin

[57] ABSTRACT

An electrical circuit adapted to control the operation of a refrigerant compressor in an automotive type air conditioning system. The electrical circuit has a pair of branch circuits, an impedance for connection in the branch circuits so as to be respectively energized and shunted therein, and condition responsive devices for enabling and disenabling one of the branch circuits. Switching means is operable for sequentially energizing and then shunting the impedance in the branch circuits to control the energization thereof subject to the enablement and disenablement of the one circuit branch by the condition responsive device.

A method of operating an electrical circuit to control the operation of a refrigerant compressor in an automotive type air conditioning system is also disclosed.

19 Claims, 4 Drawing Figures

ELECTRICAL CIRCUIT AND METHOD OF OPERATING SUCH

CROSS-REFERENCE TO RELATED APPLICATIONS

This application is related to the George E. Morris and Stewart A. Woodward application Ser. No. 349,330 filed Feb. 16, 1982 entitled "Control Device And Method Of Making", the George E. Morris application Ser. No. 349,377 filed Feb. 16, 1982 entitled "Electrical Circuit And Method Of Controlling Such", and the Donald L. Haag application Ser. No. 349,329 filed Feb. 16, 1982 entitled "Control Device, Method Of Operating And Method Of Manufacturing", and each of these aforementioned related applications filed concurrently with this application is incorporated herein by reference.

FIELD OF THE INVENTION

This invention relates in general to automotive type air conditioning systems and in particular to an electrical circuit therefor and a method of operating such electrical circuit.

BACKGROUND OF THE INVENTION

In the past, various different types of electrical circuits were utilized for controlling the operation of a refrigerant compressor in an automotive type air conditioning system. For instance, some of the past electrical circuits had a control device with a snap acting switch operable therein in response to a preselected high fluid pressure of refrigerant generally at a suction side of the compressor in the system to selectively energize a coil of a clutch device thereby to couple it in driving relation with the compressor in the system. When so driven or turned "on", the compressor was operable to compress vaporized refrigerant discharging it at a high fluid pressure and temperature into the system toward a condenser. Upon passing through the condenser, the vaporized refrigerant was, of course, condensed back to its liquid state at the high fluid pressure and temperature thereof, and from the condenser, the liquid refrigerant was orificed or passed through an expansion valve or tube. Of course, upon this orificing or expansion of the hot, high fluid pressure liquid refrigerant through the expansion valve, the refrigerant experienced a pressure and temperature drop and again changed state back to a cooler low fluid pressure vapor, and in this cooler, low fluid pressure vaporized state, the refrigerant was passed through an evaporator and back to the suction side of the compressor. When the refrigerant fluid pressure on the suction side of the compressor attained a preselected low value, the snap acting switch in the control device was operable in response thereto to effect the deenergization of the clutch device coil thereby to uncouple the clutch device from its driving relation with the compressor interrupting its operation in the system, i.e., turning "off" the compressor. Of course, the fluid pressure of the vaporized refrigerant on the suction side of the compressor was subjected to atmospheric temperature so as to be a direct function thereof, and when the fluid pressure of such vaporized refrigerant was increased in response to the atmospheric temperature to the preselected high value thereof, the control device effected the reenergization of the electrical circuit to reinitiate the operation or cycle of the compressor in the system in the same manner discussed hereinbefore.

Assuming that the windshield and other windows of an automotive vehicle employing the above discussed past air conditioning system may have accumulated some moisture or frost thereon, it was convenient to operate such past air conditioning system in order to effect the evaporation or defrost of such accumulated moisture or frost, as is well known to the art. However, if the atmospheric temperature was low, say for instance about 40° F. or less, it is believed that the fluid pressure of the refrigerant generally at the suction side of the compressor subjected to this low atmospheric temperature was maintained thereby at a value less than the preselected high value necessary to effect the operation of the snap acting switch of the control device, and as a result, the past electrical circuits may not have been energized to effect the operation of the compressor in the past air conditioning systems. This inability of the past electrical circuits and associated past air conditioning systems to remove or otherwise evaporate the accumulated moisture or frost from the inside of the vehicle windshield and other windows is believed to be one of the disadvantageous or undesirable features of such past electrical circuits for controlling such past air conditioning systems.

SUMMARY OF THE INVENTION

Among the several objects of the present invention may be noted the provision of an improved electrical circuit for an automotive type air conditioning system and an improved method of controlling an electrical circuit to effect the operation of a refrigerant compressor in an automotive type air conditioning system which overcomes at least the aforementioned disadvantageous or undesirable feature, as well as others, of the prior art; the provision of such improved electrical circuit and method in which enabling means are provided to assure energization of the electrical circuit and operation of the system when the atmospheric temperature is at or below a preselected value thereof; the provision of such improved electrical circuit and method in which a pair of circuit means are energizable in bypass relation with each other for effecting the operation of the system when the atmospheric temperature is above and below the preselected value thereof, respectively; and the provision of such improved electrical circuit and method in which the component parts utilized therein are simplistic in design, easily assembled and connected, and economically manufactured. These as well as other objects and advantageous features of the present invention will be in part apparent and in part pointed out hereinafter.

In general, an electrical circuit in one form of the invention is adapted to control the operation of a refrigerant compressor in an automotive type air conditioning system. The electrical circuit has a pair of branch circuit means interconnected in circuit relation with each other and adapted for energization so as to initiate the operation of the compressor in the system. Impedance means for connection in circuit relation with the branch circuit means is both energized and shunted therein, respectively, and condition responsive means in one of the branch circuit means disenables it and is operable generally upon the occurrence of a preselected condition for enabling the one branch circuit means. Switching means is operable generally in the other of the branch circuit means for sequentially energizing and shunting the impedance means therein with the other branch circuit means being energized to effect the operation of the compressor in the system only upon the shunting of the impedance means when the one branch circuit means is disenabled by the condition responsive means, and the switching means is also operable generally in the one branch circuit means for sequentially energizing and shunting the impedance means therein with the one branch circuit means being energized to effect the operation of the compressor in the system only upon the shunting of the impedance means when the one branch circuit means is enabled by the condition responsive means upon the occurrence of the preselected condition.

Further in general and in one form of the invention, a method is provided for controlling an electrical circuit to effect the operation of a refrigerant compressor in an automotive type air conditioning system. The electrical circuit has a pair of branch circuit means interconnected with each other and adapted for energization across a power source and impedance means for interconnection in circuit relation with the branch circuit means, respectively. Condition responsive means in one of the branch circuit means is actuated between a circuit completing position and a circuit interrupting position, and switching means is operable generally for controlling the branch circuit means. In this method, the switching means is operated toward sequential switching positions effecting the energization and then the subsequent shunting of the impedance means in the one branch circuit means and the other of the branch circuit means, and the one and other branch circuit means are energized across the power source to effect the operation of the compressor in the system when the condition responsive means is in its circuit completing position and its circuit interrupting position, respectively, upon the shunting of the impedance means.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting the scope of the invention in any manner.

DETAILED DESCRIPTION OF THE PREFERRED EMBODIMENT

Figure 1:
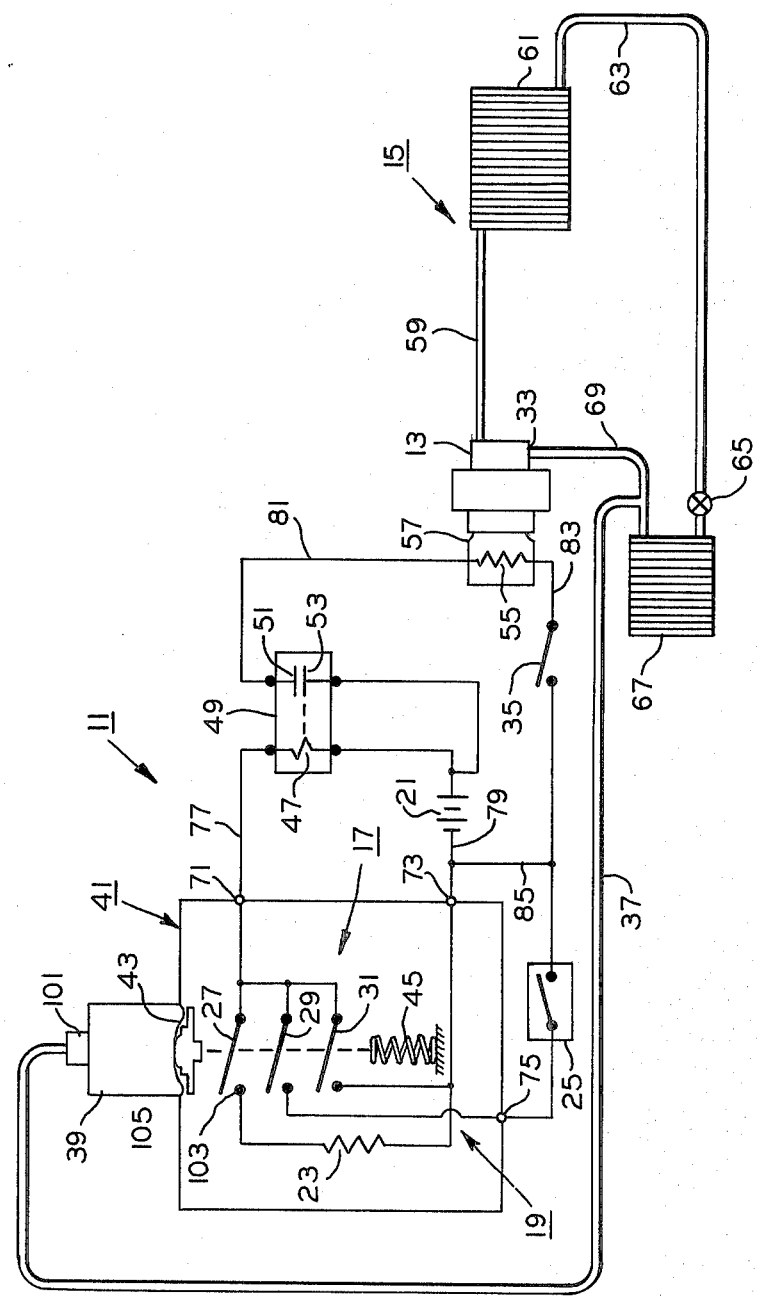
FIG. 1 is a schematic diagram showing an electrical circuit in one form of the invention adapted to control the operation of a refrigerant compressor in an automotive type air conditioning system and illustrating principles which may be practiced in a method of controlling the electrical circuit also in one form of the invention.

Referring now to the drawings in general, there is illustrated in one form of the invention a method of controlling an electrical or control circuit 11 adapted to effect the operation of a refrigerant compressor 13 in an automotive type air conditioning system 15 (FIG. 1).

Figure 2:
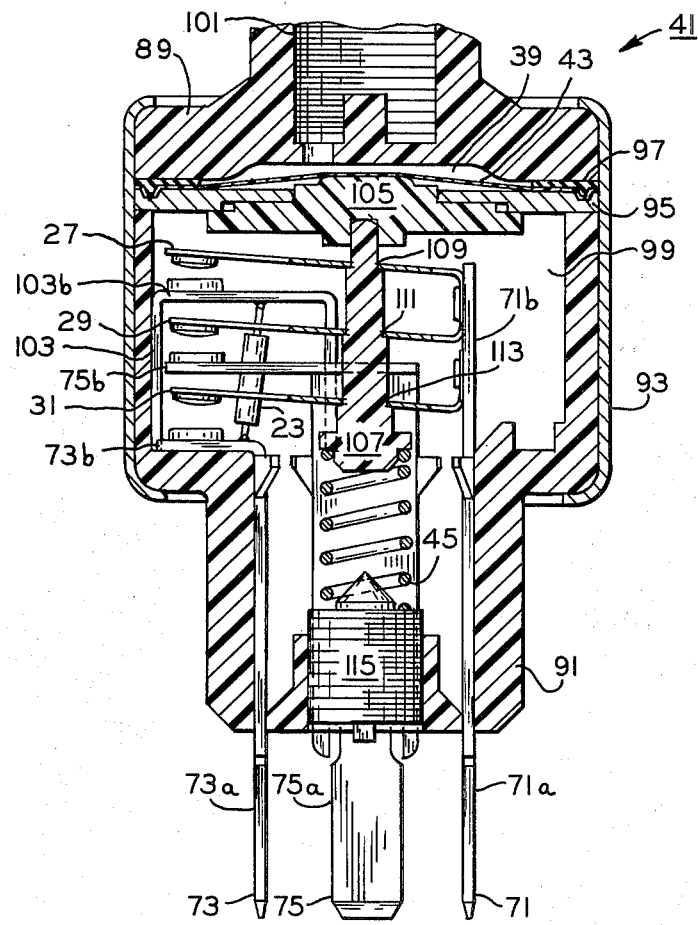
FIG. 2 is a sectional view of a control device illustrated in the electrical circuit of FIG. 1.

Electrical circuit 11 includes a pair of circuit sections or branch circuit means, indicated generally at 17, 19 interconnected with each other and adapted for energization across a power source, such as a battery 21 or the like for instance, and an impedance means, such as for instance a resistor 23 or the like, is provided for interconnection in circuit relation with circuit sections 17, 19, respectively (FIG. 1). Condition responsive means, such as a thermostatic switch 25 or the like for instance, in circuit section 19 is actuated or operated between a closed or circuit interrupting position and an open or circuit completing position, and switching means, such as for instance switch elements 27, 29, 31, is operable generally for controlling circuit sections 17, 19 (FIG. 2). In this method, switch elements 27, 29, 31 are operated or otherwise actuated or moved toward sequential switching positions effecting the energization and then the subsequent shunting of resistor 23 in circuit sections 17, 19, and in response to the operation of the switching means, the circuit sections are energized across battery 21 to effect the operation of compressor 13 in system 15 when thermostatic switch device 25 is in its closed position and open position, respectively, upon the shunting of the resistor (FIGS. 1 and 2).

More particularly and with specific reference to FIGS. 1 and 2, the monitored or refrigerant fluid pressure developed or otherwise established in system 15 at a suction side 33 of compressor 13 therein is a function of the atmospheric temperature in which the system is operated, i.e., the greater the atmospheric temperature, the greater the monitored fluid pressure. Further, when the automotive vehicle utilizing system 15 is located in an environment having an atmospheric temperature above a preselected value thereof, say 40° F. for instance, thermostatic switch device 25 is actuated or operated in response thereto toward a conductivity or switching mode, i.e., the open position thereof, which interrupts or otherwise disenables circuit section 19 with respect to vehicle battery 21 provided in electrical circuit 11. Thermostatic switch device 25 may be a model 3ART49 available from the General Electric Company, Morrison, Illinois, or other similar thermostatic switch devices readily available in the marketplace. The terms conductive or conductivity mode and switching mode as employed herein means either the open or closed positions of switch elements 27, 29, 31 and thermostatic switch device 25, respectively.

When the vehicle operator desires to place or operate system 15 in a cooling mode thereof, the operator closes an on-off manually operated switch 35, and assuming at this time that the atmospheric temperature exceeds its preselected (40° F.) value by an amount which is effective to establish at least a preselected high value of the monitored fluid pressure, say for instance at least 40 psig, at suction side 33 of compressor 13 in system 15, such monitored fluid pressure is transmitted from the compressor suction side through a conduit 37 to a refrigerant or fluid pressure chamber 39 of a control device, such as a pressure cycling switch 41 or the like for instance. The monitored fluid pressure so established in chamber 39 of control device 41 acts on the effective area of a diaphragm 43 therein to create or establish a control or motive force effective to move or actuate the diaphragm downwardly, as best seen in FIG. 1, against the compressive force of a spring 45 associated therewith in the control device. This downward movement of diaphragm 43 in response to the control force is operative to effect sequential translation or actuation of switch elements 27, 29, 31 toward conductivity or switching modes, such as closed or making positions thereof, respectively. Assuming that switch elements 27, 29, 31 are operated to their closed positions, as discussed above, at different preselected values of the monitored fluid pressure, say for instance 20 psig, 35 psig, 40 psig, respectively, then it may be noted that switch element 27 is closed in sequence prior to switch element 29 which is, in turn, closed in sequence prior to switch element 31. As a rule of thumb, when system 15 is in its off mode, the psig of the monitored fluid pressure at suction side 33 of compressor 13 in the system is approximately numerically equal to the atmospheric temperature in degrees Fahrenheit.

Resistor 23 has a preselected impedance or resistance value which is chosen or selected so as to match or be operatively compatible with a preselected pickup voltage and a preselected dropout voltage of a coil or coil means 47 in a relay device 49 connected in electrical circuit 11. Thus, upon the closure of switch element 27, as discussed above, resistor 23 is placed or otherwise connected in series circuit relation with relay coil 47 across battery 21 in electrical circuit 11, and the preselected resistance value of the resistor is effective to maintain the voltage drop across the relay coil to a value less than the preselected pickup voltage thereof. In other words, the preselected resistance value of resistor 23 is such that when switch element 27 is closed while switch element 29 is open, the voltage drop across relay coil 47 is greater than the aforementioned preselected dropout voltage thereof but less than its preselected pickup voltage, and therefore, such closure of switch element 27 effects the energization of the relay coil but will not pickup the relay coil across battery 21.

Switch element 29 is sequentially moved to its closed position in circuit section 19 in response to further control force movement of diaphragm 43 subsequent to the closure of switch element 27; however, since circuit section 19 is disenabled by thermostatic switch device 25 disposed in its open position in response to the atmospheric temperature exceeding the preselected (40° F.) value thereof, the closure of switch element 29 has no effect in electrical circuit 11 at this time.

Subsequent to the closure of switch element 29, switch element 31 is sequentially moved to its closed position in response to further control force movement of diaphragm 43. In response to this sequential or subsequent closure of switch element 31 with switch element 27 closed, as discussed above, resistor 23 is placed or otherwise connected in shunt circuit relation with relay coil 47 of relay device 49 across battery 21, and the relay coil is directly connected in circuit relation across the battery through closed switch element 33 which, of course, results in the energization or pickup of the relay coil in electrical circuit 11. Thus switch element 27 is arranged in series circuit relation with both resistor 23 and relay coil 47 across battery 21, and switch element 31 is arranged in shunt or parallel circuit relation with the resistor and switch element 27 while being connected in series circuit relation with the relay coil across the battery. In view of this circuit configuration, upon the sequential closure of switch element 31 when switch element 27 is closed, resistor 23 remains energized but is shunted so that its preselected resistance value no longer has an effect on the voltage drop across relay coil 47. Thus, relay coil 47 is picked up upon the closure of switch element 31 and acts to effect the closure of a set of contacts 51, 53 associated with the relay coil in relay device 49, and upon the closure of relay contacts 51, 53, a coil or coil means 55 in a clutch device 57 is energized across battery 21. The energization of clutch coil 57 is effective to actuate or couple clutch device 57 in its driving relation with compressor 13 to initiate its operation in system 15.

When compressor 13 is so operated or driven in system 15, refrigerant in the vapor stage thereof is drawn from suction side 33 of the compressor, compressed by the compressor and discharged therefrom as a hot high pressure vapor through a conduit 59 to a condenser 61. Upon passage through condenser 61, the hot high pressure vaporized refrigerant is condensed thereby to effect a change of state in the refrigerant which is discharged from the condenser as a hot high pressure liquid through a conduit 63. An expansion or orifice tube or valve 65 is disposed in conduit 63 between condenser 61 and an evaporator 67, and as the hot high pressure liquid refrigerant is passed or orificed through the expansion valve, a pressure and temperature drop occurs which again effects a change in state of the refrigerant so that the refrigerant enters the evaporator as a cold low pressure vapor. Of course, from evaporator 67, the cold low pressure vaporized refrigerant is delivered through a conduit 69 back to suction side 33 of compressor 13 for recycling through system 15, and conduit 69 also intersects in pressure fluid communication with conduit 37 leading to chamber 30 of control device 41 so as to effect the monitoring of the refrigerant fluid pressure at the suction side of the compressor. Although exemplary system 15 and its component parts are illustrated herein for purposes of disclosure, it is contemplated that other similar automotive type air conditioning systems may be utilized and may employ different and/or additional component parts within the scope of the invention so as to meet at least some of the objects thereof.

As is well known to the art, the fluid pressure of the refrigerant returned from evaporator 67 through conduit 69 to suction side 23 of compressor 13 is reduced in comparison with that present when switch elements 27, 29, 31 were moved to their closed positions, as previously discussed hereinabove. When this reduction of the refrigerant fluid pressure at suction side 33 of compressor 13 in system 15 occurs, such reduced refrigerant fluid pressure transmitted via conduit 37 to chamber 39 of control device 41 effects a corresponding reduction in the control force exerted by diaphragm 43 thereof. Thus, when this monitored fluid pressure is reduced below the preselected high (40 psig) value thereof, the compressive force of spring 45 overcomes the reduced control force exerted by diaphragm 43 and is effective to move or return switch element 31 to its open position or switching mode; however, at the time switch element 31 is opened, switch element 27 remains closed. Even though switch element 31 is opened, relay coil 47 remains energized or picked up in its series circuit relation with closed switch element 27 and resistor 23 across battery 21 because the preselected resistance value of the resistor maintains the voltage drop across the relay coil at a value greater than the preselected dropout voltage thereof. Of course, as the monitored fluid pressure of system 15 is further reduced below a preselected intermediate value thereof, i.e., 35 psig as previously mentioned, the control force exerted by diaphragm 43 is correspondingly further reduced, and the compressive force of spring 45 is then further effective to effect the movement or return switch element 29 to its open position. However, since circuit section 19 is disenabled by thermostatic switch device 25 in its open position, as previously mentioned, the opening of switch element 29 has no effect on electrical circuit 11 at this time. When the monitored fluid pressure of system 15 is still further reduced below a preselected low value thereof, i.e., 20 psig as previously mentioned, the control force exerted by diaphragm 43 is still further correspondingly reduced, and the compressive force of spring 45 is then further effective to effect the movement or return of switch element 27 to its open position. The opening of switch element 27 interrupts the series circuit relation therewith of both resistor 23 and relay coil 47 across battery 21 thereby to effect the deenergization of the resistor and the relay coil causing it to dropout. Of course, the dropout of relay coil 47 effects or results in the opening of contact set 51, 53 of relay device 49 which, in turn, effects the deenergization of clutch coil 55 in clutch device 57 across battery 21. When clutch coil 55 is so deenergized, clutch device 57 is deactuated or uncoupled from its driving relation with compressor 13 thereby to interrupt its operation in system 15 and the cooling mode operation thereof. So long as on-off switch 35 remains closed, electrical circuit 11 will effect the operation or cycling of compressor 13 between its off mode and its cooling mode when the monitored fluid pressure in system 15 again increases to at least the preselected high value thereof.

As previously mentioned, when system 15 is in its "off" mode, the numerical value of the monitored fluid pressure in psig at suction side 33 of compressor 13 in the system is approximately equal to the numerical value of the atmospheric temperature in degrees Fahrenheit. Thus, when the atmospheric temperature is less than its preselected (40° F.) value but at least as great as a preselected intermediate value thereof, say 35° F. for instance, then the monitored fluid pressure will be less than the preselected high (40 psig) value necessary to effect the actuation of switch element 43 in order to effect the cooling mode operation of system 15, as previously described, but at least as great as its preselected intermediate (35 psig) value. Under these conditions, thermostatic switch device 25 is actuated in response to the atmospheric temperature less than the preselected (40° F.) value thereof toward another conductivity or switching mode, i.e., to a closed or making position, in series circuit relation between switch element 29 and battery 21 thereby to enable circuit section 19.

When circuit section 19 is so enabled by thermostatic switch device 25 and the monitored fluid pressure is at least as great as the preselected intermediate (35 psig) value thereof but less than its preselected high (40 psig) value, as assumed above, the control force exerted on diaphragm 43 of control device 41 will be effective to cause the sequential operation of switch elements 27, 29 in the same manner as previously discussed hereinbefore; however, since the monitored fluid pressure is less than the preselected high (40 psig) value thereof, the sequential operation of switch element 31 is, of course, obviated. When switch element 27 is so moved to its closed position in circuit section 17 in response to the control force exerted on diaphragm 43, resistor 23 is again connected in series circuit relation with relay coil 47 across battery 21, but the preselected resistance value of the resistor obviates the pickup of the relay coil in electrical circuit 11 in the same manner as previously discussed. Upon the sequential operation of switch element 29 to its closed position in circuit section 19 in response to the control force exerted on diaphragm 43 and subsequent to the closure of switch element 27, relay coil 47 is connected in series circuit relation through closed switch element 29 and closed thermostatic switch device 25 directly across battery 21, and resistor 23 is placed or otherwise connected in shunt circuit relation with the relay coil across the battery which, of course, results in the energization or pickup of the relay coil in electrical circuit 11. Thus, switch element 27 is arranged in series circuit relation with both resistor 23 and relay coil 47 across battery 21, and both switch element 29 and thermostatic switch device 25 are arranged in shunt or parallel circuit relation with both switch element 27 and resistor 23 while being arranged in series circuit relation with the relay coil across the battery. In view of this circuit configuration, upon the sequential closing of switch element 29 when switch element 27 is closed, resistor 23 remains energized but is shunted so that its preselected resistance value no longer has an effect on the voltage drop across relay coil 47. Thus, relay coil 47 is picked up upon the closure of switch element 29 which effects the closure of contacts 51, 53 in relay device 49 thereby to energize clutch coil 55 across battery 21, and upon the energization of the clutch coil, clutch device 57 is actuated into its driving relation with compressor 13 initiating its operation in system 15 to effect the cooling mode thereof in the same manner as discussed hereinabove. Of course, during the cooling mode operation of system 15, the monitored fluid pressure at suction side 33 of compressor 13 in the system is reduced which effects a corresponding reduction in the control force exerted by diaphragm 43, and when the monitored fluid pressure is reduced below the preselected intermediate (35 psig) value thereof, the compressive force of spring 45 overcomes the reduced control force so as to return switch element 29 to its open position. At the time switch element 29 is opened, switch element 27 remains closed thereby to replace resistor 23 in series circuit relation with relay coil 47 across battery 21; however, even through switch element 29 is returned to its open position, relay coil 47 remains energized or picked up in its series circuit relation with closed switch element 27 and resistor 23 across battery 21 because the preselected resistance value of the resistor maintains the voltage drop across the relay coil at a value greater than the dropout voltage thereof. Of course, as the monitored fluid pressure is further reduced below the preselected low (20 psig) value thereof, the control force exerted by diaphragm 43 is correspondingly further reduced, and the compressive force of spring 45 is then further effective to effect the return movement of switch element 27 to its open position. The opening of switch element 27 interrupts the series circuit relation therewith of both resistor 23 and relay coil 47 across battery 21 thereby to effect the deenergization of the resistor and relay coil causing it to drop out. Of course, the dropout of relay coil 47 results in the opening of relay contacts 51, 53 of relay device 49 which, in turn, effects the deenergization of clutch coil 55 across battery 21. When clutch coil 55 is so deenergized, clutch device 57 is deactuated or uncoupled from its driving relation with compressor 13 thereby to interrupt its operation in system 15 and the cooling mode operation thereof. So long as thermostatic switch device 25 remains in its closed position, electrical circuit 11 will operate or cycle compressor 13 in system 15 to effect the off mode and the cooling mode thereof when the monitored fluid pressure at suction side 33 of the compressor in the system again increases to at least the preselected intermediate (35 psig) value thereof. While definitive preselected values have been discussed herein with respect to the atmospheric temperature and the monitored fluid pressure, it is contemplated that other such preselected values may be utilized with respect to such atmospheric temperature and monitored fluid pressure within the scope of the invention so as to meet at least some of the objects thereof.

With reference again to the drawings in general and recapitulating at least in part with respect to the foregoing, electrical circuit 11 in one form of the invention is adapted to control the operation of compressor 13 in system 15 (FIG. 1). In electrical circuit 11, circuit sections 17, 19 interconnected in circuit relation with each other are adapted for energization so as to initiate the operation of compressor 13 in system 15, and resistor 23 is provided for connection in circuit relation with the circuit sections so as to be both energized and shunted therein, respectively (FIG. 1). Thermostatic switch device 25 is operable in circuit section 19 for disabling it and operable generally upon the occurrence of a preselected condition, i.e., atmospheric temperature less than the preselected (40° F.) value thereof, for enabling circuit section 19 (FIG. 1). Switching means, such as switch elements 27, 29, 31, is operable generally in circuit section 17 for sequentially energizing and then shunting resistor 23 therein with circuit section 17 being energized to effect the operation of compressor 13 in system 15 upon the shunting of the resistor when circuit section 17 is disenabled by thermostatic switch device 25, and the switching means is also operable generally in circuit branch 19 for sequentially energizing and then shunting the resistor therein with circuit branch 19 being energized to effect the operation of the compressor in the system only upon the shunting of the resistor when circuit branch 19 is enabled by the thermostatic switch device upon the occurrence of the preselected condition, i.e., atmospheric temperature less than the preselected (40° F.) value thereof (FIGS. 1 and 2).

More particularly and with specific reference to FIGS. 1 and 2, control device 41 is provided with a plurality of terminals 71, 73, 75, and switch element 27 is connected across terminals 71, 75 while switch elements 29, 31 are connected across terminals 71, 73 in parallel circuit relation with each other. Terminals 71, 73 of control device 41 are respectively connected by a pair of leads 77, 79 across coil 47 of relay device 49 which may be a single pole, normally open type relay available under model number 83053 from Gulf and Western Manufacturing Co., Farmington Hills, Mich., and when so connected with the relay device, switch element 29 is arranged in series circuit relation between resistor 23 and the relay coil while switch element 31 is arranged in parallel circuit relation with switch element 29 and the resistor and in series circuit relation with the relay coil. Switch element 29 is arranged in parallel circuit relation with switch elements 27, 31 and resistor 23 and in series circuit relation with relay coil 47 and thermostatic switch 25. Contact set 51, 53 of relay device 49 are open or broken in the at-rest position thereof and are adapted to make or close in response to the energization of relay coil 47, as previously discussed. Relay coil 47 typically picks up, i.e., becomes energized, to effect the closure of contact set 51, 53 at a voltage several times that at which the relay coil drops out, i.e., becomes deenergized, to effect the opening of the contact set, and typically the pickup voltage of the relay coil is about eight (8) volts while the dropout voltage thereof is about three (3) volts. Battery 21 is interposed in lead 79, and contact 51 of relay device 49 is connected by a lead 81 to one side of clutch coil 55 while another lead 83 is connected between the other side of the clutch device and terminal 75 of control device 41 having thermostatic switch device 25 and on-off switch 35 serially interposed therein. An interconnecting lead 85 has one opposite end connected with lead 79 between terminal 73 of control device 41 and battery 21 while the other opposite end of the interconnecting lead is connected with lead 83 between thermostatic switch device 25 and on-off switch 35.

As illustrated in FIG. 2, control device 41 has a housing 87 including upper and lower housing members 89, 91 which may be formed of suitable dielectric material, such as a resin or the like for instance, if desired, and the housing members are retained against displacement from each other by a metallic sleeve 93 grippingly engaged therewith. Diaphragm 43, an annular washer 95, and a seal 97 are captured between housing members 89, 91, and the diaphragm defines with the housing members pressure fluid chamber 39 and a switch means accommodating chamber 99 therein, respectively. A control port 101 is provided in upper housing member 89 in pressure fluid communication with chamber 39, and the control port receives conduit 37 which is connected in system 15 with suction side 33 of compressor 13, as previously mentioend.

Terminals 71, 73, 75 are mounted by suitable means to lower housing member 91 with the terminals having electrical connector sections 71a, 73a, 75a extending exteriorly of the lower housing member for connection with leads 77, 79, 83 in electrical circuit 11, and switch means supporting or contact sections 71b, 73b, 75b on the terminals are disposed within switch chamber 99 of the lower housing. Another terminal or switch means supporting member 103 is mounted by suitable means to lower housing member 91 within switch chamber 99 and has another switch means supporting or contact section 103b thereon, and resistor 23 is electrically connected between supporting sections 73b, 103b of terminals 73, 103. Supporting sections 73b, 75b, 103b of terminals 73, 75, 103 are disposed at preselected elevations or levels with respect to each other within switch chamber 99, and although not shown for the sake of drawing simplicity, adjusting screws may be threadedly provided in lower housing member 91 for adjusting engagement with supporting sections 73b, 75b, 103b of terminals 73, 75, 103 to adjust the preselected elevations thereof within the switch chamber. Switch elements 27, 29, 31 are mounted by suitable means, such as rivets or the like for instance, in electrical conductive association with supporting section 71b of terminal 71 within switch chamber 99 of lower housing member 91, and switch elements 27, 29, 31 are arranged to make with and break from supporting sections 75b, 103b, 73b of terminal 75, 103, 73, respectively.

A plunger 105 is guidably or slidably received in annular washer 95 extending therethrough into driven or abutting relation with a control portion of diaphragm 43 within switch chamber 99, and a spacer 107 has an upper end guidably retained by the plunger while the lower end of the spacer is arranged in retaining engagement with spring 45 so as to transmit thereto the control force exerted by the diaphragm, as previously mentioned. Spacer 107 extends through a plurality of apertures 109, 111, 113 respectively provided in switch elements 27, 29, 31, and a plurality of spaced apart shoulders or abutments on the spacers abut or engage with the switch elements generally about the apertures therein so as to urge the switch elements toward switching positions away or broken from switch sections 73b, 75b, 103b of terminals 73, 75, 103 in response to the compressive force of spring 45 exerted on the spacer. An adjusting screw 115 is threadedly or adjustably received in lower housing member 91 in adjusting and retaining engagement with spring 45, and in this manner, the compressive force of the spring is adjustably urged against spacer 107, plunger 105 and diaphragm 43 so as to oppose the control force movement of the diaphragm.

In the operation of control device 41 when it is connected in electrical circuit 11, as previously described, assume that the component parts of the control device are disposed in the respective at-rest positions thereof as illustrated in FIG. 2. When the monitored or refrigerant fluid pressure of the preselected low (20 psig) value is established at control port 101, it acts on the effective area of diaphragm 43 in fluid pressure chamber 39 of upper housing member 89 to establish the control force acting against the adjusted compressive force of spring 45 and operable for effecting a slow or creep type actuation of switch elements 27, 29, 31. Thus, diaphragm 43 is flexed or moved downwardly in response to the control force exerted thereon, and such downward movement of the diaphragm is translated therefrom through plunger 105 and spacer 107 which are conjointly movable with the diaphragm downwardly against the compressive force of spring 45. Of course, the inherent resiliency of switch elements 27, 29, 31 effects the following or conjoint movement thereof downwardly with spacer 107, and upon this downward or pivotal movement of the switch elements about switch section 71b of terminal 71, switch element 27 makes with switch section 103b of terminal 103 while switch elements 29, 31 remain broken from switch sections 75b, 73b of terminals 75, 73, respectively. Thus, in the conductivity mode of switch element 27 when made with switch section 103b of terminal 103, circuit 11 is completed through control device 41 from terminal 71 through switch element 27, terminal 103, resistor 23 to terminal 73. In this manner, when switch element 27 is made with switch section 103b of terminal 103, switch element 27 is placed in series circuit relation with resistor 23 across terminals 71, 73, and heat generated upon the energization of the resistor in switch chamber 99 acts to eliminate at least some condensation and/or frost which may accumulate therein.

In the event of the increase of the monitored fluid pressure at control port 101 to the preselected intermediate (35 psig) value thereof, as discussed above, the control force acting on diaphragm 43 is correspondingly increased which, of course, effects the further conjoint downward movement of the diaphragm, plunger 105 and spacer 107 against the compressive force of spring 45. The resiliency of switch element 29 effects the further following or conjoint movement thereof with spacer 107 while switch element 27 remains made with switch section 103b of terminal 103, and upon this further movement of switch element 29 it becomes made with switch section 75b of terminal 75. Of course, the engagement between spacer 107 and switch element 27 is interrupted upon the further downward movement of the spacer to make switch element 29. Thus, in the conductivity mode of switch element 29 when made with support section 75b of terminal 75, circuit section 19 may be completed and interrupted when thermostatic switch device 25 is in its closed and open positions, respectively, as previously discussed.

In the event of the increase of the monitored fluid pressure at control port 101 to at least the preselected high (40 psig) value, as discussed above, the control force acting on diaphragm 43 is correspondingly increased which, of course, effects the further conjoint downward movement of the diaphragm, plunger 105 and spacer 107 against the compressive force of spring 45. The resiliency of switch element 31 effects the further following or conjoint movement thereof with spacer 107 while switch elements 27, 29 remain made with switch sections 75b, 103b of terminals 75, 103, respectively, and upon this further movement of switch element 31, it becomes made with support section 73b of terminal 73. Of course, the engagement between spacer 107 and switch element 29 is interrupted upon the further downward movement of the spacer to make switch element 31. Thus, in the conductivity mode of switch element 31 when made with switch section 75b of terminal 75, circuit 11 is completed through control device 41 from terminal 71 through switch element 31 and terminal 73. Thus, switch elements 27, 29, 31 are sequentially made or actuated in circuit 11 in parallel circuit relation with each other, and resistor 23 remains energized in the circuit while being shunted when switch element 31 is made in circuit relation across terminals 71, 73.

When the monitored fluid pressure at control port 101 is reduced to a value less than the preselected low (20 psig) value thereof, the control force acting on diaphragm 43 is, of course, correspondingly reduced, and the compressive force of spring 45 returns or moves spacer 107, plunger 105 and the diaphragm conjointly upwardly toward their original or at-rest positions in control device 41. Upon this return movement in response to the compressive force of spring 45, spacer 107 initially drives switch element 31 upwardly breaking it from support section 73b of terminal 73 thereby to interrupt circuit section 17 through switch element 31 between terminals 71, 73; however, upon the breaking of switch element 31, switch elements 27, 29 are still closed so that resistor 23 remains energized in the circuit across terminals 71, 73. Upon further return movement of diaphragm 43, plunger 105 and spacer 107 in response to the compressive force of spring 45 subsequent to the breaking of switch member 31, the spacer reengages switch element 29 to drive or move it upwardly breaking it from switch section 75b of terminal 75 thereby to interrupt circuit section 19 between terminals 71, 75 when thermostatic switch device is in its closed position. Upon still further return movement of diaphragm 43, plunger 105 and spacer 107 in response to the compressive force of spring 45 subsequent to the breaking of switch element 29, the spacer reengages switch element 27 to drive or move it upwardly breaking it from switch section 103b of terminal 103 thereby to interrupt circuit section 17 between terminals 71, 73. Thus, when switch elements 29, 31 are also sequentially broken in the parallel relation thereof, resistor 23 remains energized in its parallel or shunt circuit relation across terminals 71, 73 until switch element 27 is also broken from switch section 103b of terminal 103. Upon the return of the component parts of control device 41 to their respective at-rest positions, the control device may be reactuated in the same manner described above upon the reestablishment of the monitored fluid pressure to the preselected high (40 psig) value thereof at control port 101 of the control device. If a more detailed description of the construction and operation of control device 41 is desired, reference may be had to the George E. Morris and Stewart A. Woodward application Ser. No. 349,330 filed Feb. 16, 1982 which is incorporated herein by reference as previously mentioned.

While control device 41 is disclosed herein as having three separate switch elements 27, 29, 31 operatively connected in circuit 11 merely for the purposes of disclosure, as illustrated in FIGS. 1 and 2, it is contemplated that other control devices having different switch elements or switching configurations may be utilized in electrical circuit 11 in one form of the invention so as to meet at least some of the objects thereof.

Figure 3:
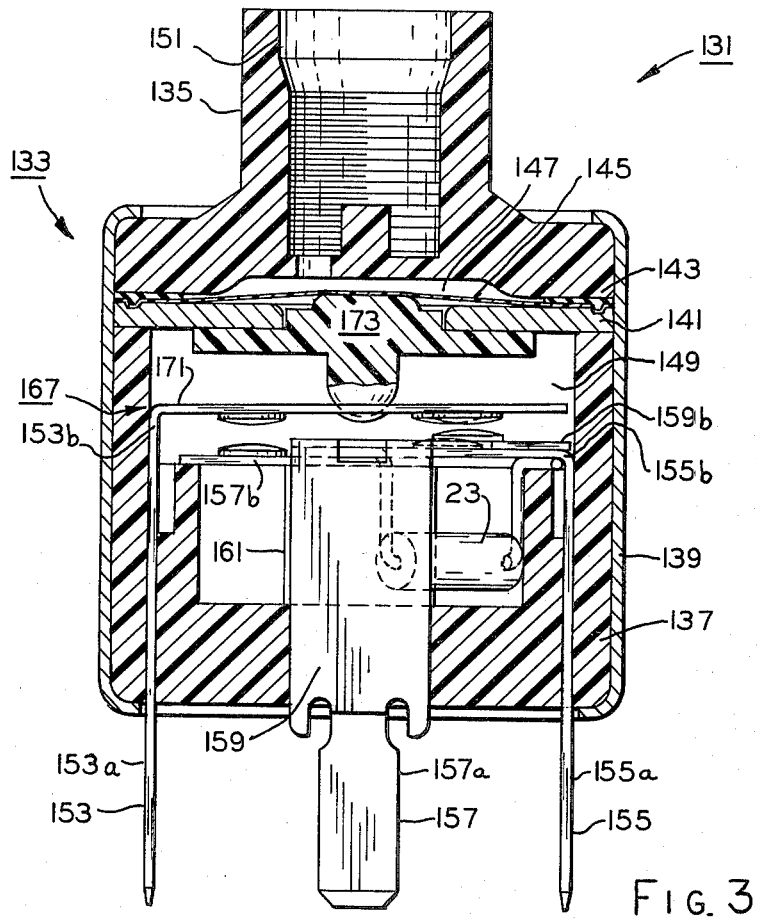
FIG. 3 is a sectional view of an alternative control device which may be utilized in the electrical circuit of FIG. 1.
Figure 4:
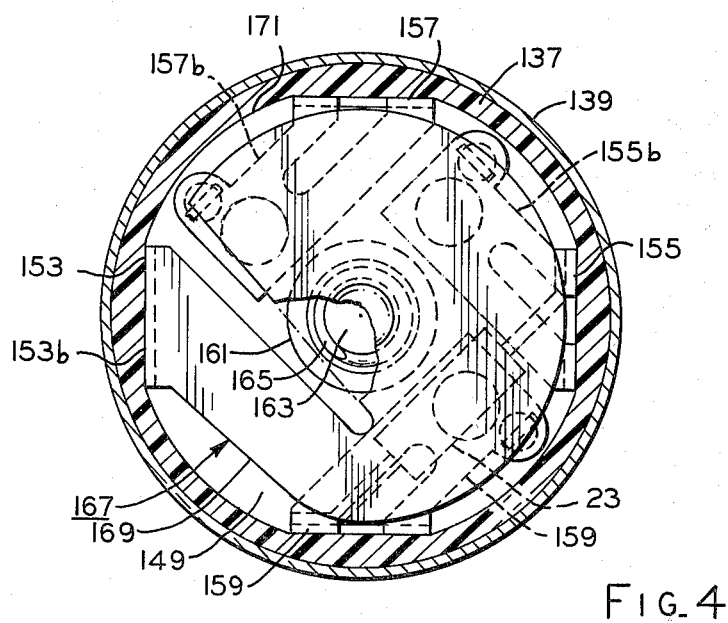
FIG. 4 is a sectional view taken along line 4—4 of FIG. 3.

With reference to FIGS. 3 and 4, another or an alternative control device or pressure cycling switching 131 is shown having generally the same component parts and functioning in electrical circuit 11 generally in the same manner as the previously discussed control device 41 with the exceptions set out hereinafter.

Control device 131 has a housing 133 including upper and lower housing members 135, 137 which may be formed of suitable dielectric material, such as a resin or the like for instance, if desired, and the housing members are retained against displacement by a metallic sleeve 139 grippingly engaged therewith. An annular metallic washer 141 and a seal 143 are interposed between housing members 135, 137, and a diaphragm 145 is captured between the washer and seal extending between the housing members so as to define therewith a pressure fluid chamber 147 and a switch means accommodating chamber 149. A control port 151, which receives conduit 37 of system 15, is provided in upper housing member 89 in pressure fluid communication with chamber 147 thereof.

A plurality of terminals or switch means supporting members 153, 155, 157 are mounted by suitable means to lower housing member 139 with the terminals having electrical connector sections 153a, 155a, 157a extending exteriorly of the lower housing member for connection with leads 77, 79, 83 in electrical circuit 11, and switch means supporting or contact sections 153b, 155b, 157b on the terminals are disposed within switch chamber 149 of the lower housing. Another terminal or switch means supporting member 159 is mounted by suitable means within switch chamber 149 and has another switch means supporting section 159b thereon, and resistor 23 is electrically connected between supporting sections. Supporting sections 155b, 157b, 159b of terminals 155, 157, 159 are disposed at preselected elevations or levels with respect to each other within switch chamber 149, and although not shown for the sake of drawing simplicity, adjusting screws may be threadedly provided in lower housing member 137 for adjusting engagement with supporting sections 155b, 157b, 159b of terminals 155, 157, 159 to adjust the preselected elevations or levels thereof within the switch chamber.

A hub 161 is integrally formed on lower housing member 137 so as to extend into switch chamber 149 thereof, and an adjusting member 163 is threadedly received in the hub. A spring 165 is disposed in part in hub 161, and one end of the spring is engaged with adjusting member 163 while the other end of the spring is seated against a switching means or switch element 167. Switch element 167 includes a pivot arm 169 integrally formed and pivotally associated with supporting section 151b of terminal 151 within switch chamber 149 of lower housing member 137, and a contact arm 171 of the switch element is split from the pivot arm and disposed in overlaying or spaced apart relation with supporting sections 153b, 155b, 157b of terminals 153, 155, 157 within the switch chamber for selective contact or circuit completing and interrupting association therewith, respectively. A force transmitting plunger 173 is slidably or guidably received in washer 141 and disposed in abutment between diaphragm 145 and switch element 167. Thus, by adjusting the position of adjusting member 161 in hub 159 of lower housing member 139 against spring 165, the compressive force of the spring is adjustably urged against contact arm 171, switch element 167, plunger 173 and diaphragm 145 so as to oppose movement of the diaphragm in response to a control force exerted thereon by fluid pressure established in pressure fluid chamber 147 acting on the effective area of the diaphragm, as discussed hereinafter.

In the operation of control device 131 when it is connected in electrical circuit 11 and system 15, as previously discussed, assume that the component parts of the control device are disposed in the respective at-rest positions thereof as illustrated in FIGS. 5 and 6. When the monitored fluid pressure of the preselected low (20 psig) value is transmitted from suction side 33 of compressor 13 through system conduit 37 to pressure fluid chamber 149 of control device 131, it acts on the effective area of diaphragm 145 to establish a control force acting against the adjusted compressive force of spring 165 and operable through plunger 173 to effect a slow or creep type actuation of switch element 167. The control force is transmitted through plunger 173 onto contact arm 171 of switch element 167 to initially effect a conjoint pivotal movement of the contact arm and pivot arm 169 generally about its pivotal association with supporting section 153b of terminal 153 until the contact arm is moved into making engagement with supporting section 159b of terminal 159. In this conductivity mode of switch element 167 with its contact arm 171 so made with supporting section 159b of terminal 159, electrical circuit 11 is completed through control device 131 from terminal 153 through the switch element, terminal 159, resistor 23 to terminal 155. Thus, switch element 167 and resistor 23 are placed in series circuit relation with coil 47 of relay device 49 across battery 21, but the preselected resistance value of the resistor obviates pickup of the relay coil in electrical circuit 11 at this time, as previously mentioned.

When the monitored fluid pressure in chamber 147 of control device 131 is increased to the preselected intermediate (35 psig) value thereof, the control force is correspondingly increased effecting further conjoint downward movement of diaphragm 145 and plunger 173 to pivotally move or roll contact arm 171 of switch element 167 about its making engagement with supporting section 159b of terminal 159 into making engagement with supporting section 157b of terminal 157. In this conductivity mode of switch element 167 with contact arm 171 thereof made with both supporting sections 157b, 159b of terminals 157, 159, circuit section 19 may be completed and interrupted when thermostatic switch device 25 is in its closed and open positions, respectively, as previously discussed.

When the monitored fluid pressure in chamber 147 of control device 131 is further increased to at least the preselected high (40 psig) value thereof, the control force is again correspondingly increased effecting further conjoint downward movement of diaphragm 145 and plunger 173 to further pivotally move or roll contact arm 171 of switch element 167 about its making engagement with both supporting sections 157b, 159b of terminals 157, 159 into further making engagement with supporting section 155b of terminal 155. In this conductivity mode of switch element 167 with its contact arm 171 made with each supporting section 155b, 157b, 159b of terminals 155, 157, 159, circuit section 17 is completed through control device 131 from terminal 153 through the switch element and terminal 155. Thus, when contact arm 171 of switch element 167 is so sequentially made with supporting sections 155b, 157b, 159b of terminals 155, 157, 159, resistor 23 is energized in circuit 11 but shunted when the contact arm is made in circuit relation across terminals 153, 155. Upon the sequential making of contact arm 171 on switch elements with terminals 155, 157, 159, as discussed above, resistor 23 is shunted in circuit section 17, and coil 47 of relay device 49 is energized through the switch element directly across battery 21 thereby to pickup the relay coil in circuit 11. Upon such pickup of relay coil 47, contact set 51, 53 of relay device 49 are actuated to their closed position energizing clutch coil 55 across battery 21 thereby to couple clutch device 57 in its driving relation with compressor 13 and effect its operation in system 15, as previously discussed.

When the monitored fluid pressure in chamber 147 of control device 131 is successively reduced below the preselected high, intermediate and low values thereof in response to the operation of compressor 13 in system 15, as previously described, the control force is, of course, correspondingly reduced, and the compressive force of spring 165 acting on contact arm 171 of switch element 167 is effective to conjointly move or return the switch element, diaphragm 145 and plunger 173 toward their at-rest positions. During this return movement by spring 165, contact arm 171 of switch element 167 is initially pivotally moved or otherwise rolled about its making engagement with supporting sections 157b, 159b of terminals 157, 159 toward a position broken or disengaged from supporting section 155b of terminal 155. Thereafter, in response to further return movement, contact arm 171 is further pivotally moved or rolled about its making engagement with supporting section 159b of terminal 159 toward a position broken or disengaged from supporting section 157b of terminal 157. As the monitored fluid pressure in control device chamber 147 is reduced at least to the preselected low (20 psig) value thereof, switch element 167 is urged toward its at-rest position by spring 165 with pivot arm 169 and contact arm 171 being conjointly pivoted about supporting section 153b of terminal 153 to break or disengage the contact arm from supporting section 159b of terminal 159. Thus, when contact arm 171 of switch element 167 is sequentially broken from supporting sections 155b, 157b, 159b of terminals 155, 157, 159, as discussed above, resistor 23 remains energized in its parallel or shunt circuit relation across terminals 153, 155 until the contact arm is sequentially broken from supporting section 159b of terminal 159 thereby to effect the deenergization of electrical circuit 11 across battery 21 and terminate the operation of compressor 13 in system 15, as previously discussed. If a more detailed discussion of control device 131 and its operation is desired, reference may be had to the Donald L. Haag application Ser. No. 349,329 filed Feb. 16, 1982 which is incorporated herein by reference, as previously mentioned.

From the foregoing, it is now apparent that a novel electrical circuit 11 and a novel method of operating such electrical circuit have been provided meeting the objects and advantageous features set out hereinbefore, as well as others, and it is contemplated that changes as to the precise arrangements, shapes, details and connections of the components of such novel electrical circuit and method, as well as the precise steps and the order thereof of such novel method, may be made by those having ordinary skill in the art without departing from the spirit of the invention or the scope thereof, as set out in the claims which follow.

What I claim as new and desire to secure by Letters Patent of the United States is:

1. An electrical circuit adapted for controlling the operation of a refrigerant compressor in an automotive type air conditioning system, the circuit comprising:

a battery;

a clutch device for coupling in driving relation with the compressor to effect the operation thereof in the system and including first coil means adapted for energization across said battery to effect the coupling of said clutch device in the driving relation thereof with the compressor;

a relay device including at least a set of contact means operable generally between an open position and a closed position for controlling the energization of said first coil means across said battery, and second coil means adapted for energization in series with said battery to effect the operation of said at least contact means set;

temperature responsive means operable generally in the event of the occurrence of an atmospheric temperature less than a preselected value for switching from one of the conductivity modes of a pair thereof to the other of the conductivity modes into circuit relation with said battery;

resistor means for selective connection in circuit relation with said second coil means and said battery and having a preselected resistance value;

means operable from an open position to a closed position for switching said resistor means and said battery into series circuit relation with said second coil means when said temperature responsive means is in the one conductivity mode thereof and with the preselected resistance value being effective to obviate the energization of said second coil means in the circuit relation thereof with said battery;

means operable from an open position to a closed position generally sequentially subsequent to said first named switching means for switching said second coil means into circuit relation with said battery and said temperature responsive means when in the other conductivity mode thereof to effect the energization of said second coil means and the operation in response thereto of said at least contact means set to the closed position thereof so as to energize said first coil means across said battery and effect the coupling of said clutch device in its driving relation with the compressor;

means operable from an open position to a closed position generally sequentially subsequent to the operation of said last named switching means for shunting said resistor means and said last named switching means in the series circuit relation thereof with said battery and for switching said second coil means directly into circuit relation with said battery when said temperature responsive means is in the one conductivity mode thereof to effect the energization of said second coil means and the operation in response thereto of said at least one contact means set to the closed position thereof so as to energize said first coil means across said battery and effect the coupling of said clutch device in its driving relation with the compressor;

diaphragm means subjected to a monitored fluid pressure in the system and movable in response to first, second and third increasing preselected values of the monitored fluid pressure for effecting the sequential operation of said first named switching means, said last named switching means, and said shunting and switching means, respectively; and resilient means operable generally for opposing the movement of said diaphragm means and for effecting the sequential return from the closed position to the open position of said shunting and switching means, said last named switching means, and said first named switching means upon successive decreases in the monitored fluid pressure acting on said diaphragm means to values less than the third, second and first preselected values of the monitored fluid pressure, respectively.

2. An electrical circuit adapted to control the operation of a refrigerant compressor in an automotive type air conditioning system, the circuit comprising:

a power source;

a clutch device energized across said power source for coupling in driving relation with the compressor;

a relay device having a preselected pickup voltage and a preselected dropout voltage and energized across said power source for controlling the energization of said clutch device;

at least three means operable generally sequentially for switching between a pair of conductive modes to control the energization of said relay device;

fluid pressure responsive means subjected to different preselected values of a monitored fluid pressure in the system and movable in response thereto for actuating a first one of said switching means to one of its conductivity modes prior to the sequential actuation of another of said switching means and a third one of said switching means to one of the conductivity modes thereof, respectively;

temperaure responsive means operable generally in one of the conductivity modes of a pair thereof in the event of the occurrence of an atmospheric temperature less than a preselected value for effecting the energization of said relay device at its preselected pickup voltage across said power source when the another switching means is in the one conductivity mode thereof; and resistor means for connection in series with said relay device and said power source by said first one switching means in the one conductivity mode thereof and having a preselected resistance value effective to maintain the voltage drop across said relay device to a value less than the pickup voltage thereof and said resistor means being shunted to effect the energization of said relay device at least at the pickup voltage thereof across said power source upon the sequential actuation of said another switching means and said third one switching means to the one conductivity modes thereof when said temperature responsive means is in its one conductivity mode and the other of the conductivity modes thereof, respectively.

3. An electrical circuit as set forth in claim 2 wherein said clutch device includes coil means adapted for energization to effect the coupling of said clutch device in its driving relation with the compressor, said coil means being energized when said relay device is energized at least at the preselected pickup voltage thereof across the power source.

4. An electrical circuit as set forth in claim 2 wherein said relay device includes coil means adapted for energization across said power source and defining the preselected pickup voltage and the preselected dropout voltage of said relay device, and at least one set of contacts operable generally in response to the energization of said coil means at least at the preselected pickup voltage thereof for effecting the energization of said clutch device across said power source.

5. An electrical circuit as set forth in claim 2 wherein said temperature responsive means comprises a thermostatic switching device operable generally in the one conductivity mode thereof for switching said relay device into series circuit relation with each other across said power source and said another switching means in its one conductivity mode to effect the energization of said relay device and said thermoplastic switching device being operable in its other conductivity mode when the atmospheric temperature is greater than the preselected value thereof to interrupt the energization of said relay device across said power source through said another switching means in the one conductivity mode thereof.

6. An electrical circuit as set forth in claim 2 further comprising resilient means associated with said fluid pressure responsive means so as to oppose the sequential switching means actuating movement thereof and operable generally for sequentially effecting the return of said at least three switching means to the other of the conductivity modes thereof when the monitored fluid pressure acting on the fluid pressure responsive means is reduced to values below the different preselected values of the monitored fluid pressure, respectively.

7. An electrical circuit adapted to control the operation of a refrigerant compressor in an automotive type air conditioning system, the circuit comprising:

a DC power source;

a relay device adapted for energization in circuit relation with said DC power source and having a preselecting pickup voltage and a preselected dropout voltage;

resistor means for selective connection in circuit relation with said relay device and said DC power source and having a preselected resistance value;

temperature responsive means operable generally in the event of the occurrence of an atmospheric temperature less than a preselected value for switching from one of the conductivity modes of a pair thereof to the other of its conductivity modes in circuit relation with said DC power source;

means operable generally for switching said resistor means and said DC power source into circuit relation with said relay device with the preselected resistance value of said resistor means being effective to generally maintain the voltage drop across said relay device to a value less than the preselected pickup voltage thereof so as to obviate its pickup energization;

means operable generally subsequent to the operation of said first named switching means for switching said relay device into circuit relation with said DC power source and said temperature responsive means when in the other conductivity mode thereof so as to shunt said resistor means and effect the energization of said relay device at least at the preselected pickup voltage thereof; and means operable subsequent to the operation of said last named switching means for switching said relay device into circuit relation with said DC power source so as to shunt said resistor means and effect the energization of said relay device at least at the preselected pickup voltage thereof when said temperature responsive means is in its one conductivity mode.

8. An electrical circuit adapted to control the operation of a refrigerant compressor in an automotive type air conditioning system, the circuit comprising:

a DC power source;

a relay device adapted for energization in circuit relation with said DC power source and having a preselected pickup voltage;

resistor means for connection in circuit relation with said DC power souce and said relay device and having a preselected resistance value;

temperature responsive means operable generally in the event of the occurrence of an atmospheric temperature less than a preselected value for switching to one of the conductivity modes of a pair thereof in circuit relation with said DC power source; and switching means adapted for sequential operation to switching positions controlling the energization of said relay means, said switching means being initially sequentially operable to one of the switching positions thereof to place said resistor means in circuit relation with said relay means and said DC power source with the preselected resistance value of said resistor means being effective to maintain the voltage drop across said relay device to a value less than the preselected pickup value thereof, said switching means being thereafter sequentially operable to another of the switching positions thereof shunting said resistor means and interconnecting said relay device in circuit relation with said DC power source to effect the energization of said relay device at least at the pickup voltage thereof when said temperature responsive means is in its one conductivity mode, and said switching means being further sequentially operable to a third one of the switching positions thereof also shunting said resistor means and interconnecting said relay device in circuit relation with said DC power source to effect the energization of said relay device at least at the pickup voltage thereof when said temperature responsive means is in the other of the conductivity modes thereof.

9. An electrical circuit adapted to control the operation of a refrigerant compressor in an automotive type air conditioning system, the circuit comprising:

a pair of branch circuit means interconnected in circuit relation with each other and adapted for energization so as to initiate the operation of the compressor in the system, respectively;

impedance means for connection in circuit relation with said branch circuit means so as to be both energized and shunted therein, respectively;

condition responsive means in one of said branch circuit means for disenabling it and operable generally upon the occurrence of a preselected condition for enabling said one branch circuit means; and switching means operable generally in the other of said branch circuit means for sequentially energizing and then shunting said impedance means therein with said other branch circuit means being energized to effect the operation of the compressor in the system only upon the shunting of said impedance means when said one branch circuit means is disenabled by said condition responsive means and said switching means also being operable generally in said one branch circuit means for sequentially energizing and then shunting said impedance means therein with said one branch circuit means being energized to effect the operation of the compressor in the system only upon the shunting of said impedance means when said one branch circuit means is enabled by said condition responsive means upon the occurrence of the preselected condition.

10. An electrical circuit as set forth in claim 9 wherein said condition responsive device comprises a thermostatic switch device subjected to atmospheric temperature and operable between a pair of conductivity modes, said thermostatic switch device being operable from one of its conductivity modes effecting the disenablement of said one branch circuit means to the other of its conductivity modes effecting the enablement of said one branch circuit means in response to the atmospheric temperature less than a preselected value thereof which constitutes the preselected condition.

11. An electrical circuit as set forth in claim 9 wherein said impedance means comprises a resistor having a preselected resistance value great enough to prevent the energization of said branch circuit means until said resistor is shunted by said switching means.

12. An electrical circuit adapted to control the operation of a refrigerant compressor in an automotive type air conditioning system, the electrical circuit comprising:

a DC power source;

a pair of branch circuit means interconnected in circuit relation with each other and adapted for energization across said DC power source;

resistor means for connection in circuit relation with said branch circuit means so as to be both energized and shunted therein, respectively, and having a preselected resistance value;

a relay device connected with said branch circuit means and adapted for energization at a preselected pickup voltage thereof across said DC power source to effect the operation of the compressor in the system;

a thermostatic switch device in one of said branch circuit means and operable generally in the event of the occurrence of at atmospheric temperature less than a preselected value for actuating from one of the conductivity modes of a pair thereof disconnecting said one branch circuit means from said DC power source to the other of the conductivity modes thereof connecting said one branch circuit with said DC power source;

switching means operable generally in said branch circuit means toward one of the switching positions of a plurality thereof for energizing said resistor means in circuit relation with said relay device and toward other switching positions for respectively shunting said resistor device and energizing said relay device in said branch circuit means to effect the operation of the compressor in the system, the preselected resistance value of said resistor being great enough to obviate the pickup of said relay device at the preselected voltage thereof in said branch circuit means when said switching means is in the first named switching position thereof; and a thermostatic switching device connected in one of said branch circuit means between said switching means and said DC power source and operable generally in the event of the occurrence of an atmospheric temperature less than a predetermined value for actuation from one of the conductivity modes of a pair thereof interrupting said one branch circuit means to said DC power source to the other of the conductivity modes thereof completing said one branch circuit means with said DC power source.

13. A method of controlling an electrical circuit to effect the operation of a refrigerant compressor in an automotive type air conditioning system, the electrical circuit including a pair of branch circuit means interconnected with each other and adapted for energization across a power source, impedance means for interconnection in circuit relation with the branch circuit means, respectively, condition responsive means in one of the branch circuit means and actuated between a circuit interrupting position and a circuit completing position, and switching means operable generally for controlling the branch circuit means, the method comprising the steps of:

operating the switching means toward sequential switching positions effecting the energization and then the subsequent shunting of the impedance means in the one branch circuit means and the other of the branch circuit means and energizing the one and other branch circuit means across the power source to effect the operation of the compressor in the system when the condition responsive means is in its circuit completing position and its circuit interrupting position, respectively, upon the shunting of the impedance means.

14. The method as set forth in claim 13 wherein the impedance means has a preselected impedance value and wherein the operating and energizing step includes imposing the preselected impedance value of the impedance means across the one and other branch circuit means upon the energization of the impedance means therein to obviate the energization of the one and other branch circuit until the impedance means is shunted by the switching means.

15. The method as set forth in claim 13 comprising the preliminary step of monitoring the fluid pressure of the refrigerant in the system and driving the switching means in response to different preselected values of the refrigerant fluid pressure in the system to effect the operation of the switching means toward its sequential switching positions.

16. The method as set forth in claim 13 wherein the operating and energizing step includes subjecting the condition responsive means to atmospheric temperature and actuating the conditon responsive means between its circuit interrupting position and its circuit completing position when the atmospheric temperature is less than and exceeds a preselected value thereof, respectively.

17. A method of controlling an electrical circuit to effect the operation of a refrigerant compressor associated with a switch device adaped for coupling in driving relation therewith in an automotive type air conditioning system, the electrical circuit including switching means for sequential operation into a plurality of switching positions, a resistor, a relay device, coil means for actuating the clutch device, and a thermostatic switch device for actuation between a circuit completing position and a circuit interrupting position and subjected to atmospheric temperature, the method comprising the steps of:

monitoring the fluid pressure of the refrigerant in the system and actuating the thermostatic switch to its circuit interrupting position and its circuit completing position when the atmospheric temperature is less than and exceeds a preselected value thereof, respectively;

effecting the sequential operation of the switching means to the different switching positions thereof in response to different preselected values of the monitored refrigerant fluid pressure; and placing the resistor in circuit relation with the relay device upon the sequential operation of the switching means to one of its switching positions to obviate the actuation of the relay device and actuating the relay device upon the subsequent sequential operation of the switching means to another of its switching positions and a third one of its switching positions shunting the resistor in its circuit relation with the relay device when the thermostatic switch device is in its circuit completing position and its circuit interrupting position, respectively, so as to effect the energization of the coil means to couple the clutch device in its driving relation with the compressor initiating its operation in the system.

18. A method of controlling an electrical circuit to effect the operation of a refrigerant compressor in an automotive type air conditioning system, the electrical circuit including a pair of branch circuit means for interconnection in bypass relation with each other, switching means for operation in the branch circuit means to effect the operation of the compressor in the system, and one of the branch circuit means including means actuated in response to atmospheric temperature for enabling and disabling the one branch circuit means, the method comprising the steps of:

monitoring the refrigerant fluid pressure in the system and subjecting the enabling and disabling means to the atmospheric temperature; and actuating the enabling and disabling means in the event of the occurrence of atmospheric temperature less than and in excess of a preselected value thereof to effect the enablement and disenablement of the one branch circuit means, respectively, and operating the switching means upon the occurrence of at least a pair of preselected values of the monitored fluid pressure in the system to a pair of positions in the branch circuit means effecting the operation of the compressor in the system where the one branch circuit means is enabled and disenabled by the enabling and disabling means, respectively.

19. A method of controlling an electric circuit to effect the operation of a refrigerant compressor in an automotive type air conditioning system with the electrical circuit having a battery, at least three switch elements, a resistor having a preselected resistance value, a thermostatic switch operable between an open position and a closed position, a clutch device for coupling in driving relation with the compressor and including a first coil, and a relay device including a second coil having a preselected pickup voltage, and a set of contacts, the method comprising the steps of:

actuating the thermostatic switch to one of its open and closed positions in response to atmospheric temperature in excess of a preselected value thereof and less than the preselected value, respectively, and placing the battery in circuit relation with the thermostatic switch when in its closed position;

closing one of the switch elements prior to the others of the at least three switch elements and placing the resistor in series circuit relation with the second coil of the relay device across the battery with the preselected resistance value of the resistor being effective to maintain the voltage drop across the second coil to a value less than the preselected pickup voltage of the second coil;

closing another of the switch elements subsequent to the closure of the one switch element so as to shunt the resistor and energizing thereby the second coil of the relay device at least at the preselected pickup voltage thereof across the battery through the closed another switch element when the thermostatic switch is in its closed position;

effecting closure of the contact set of the relay device in response to the energization of the second coil thereof upon the closure of the another switch element when the thermostatic switch is in its closed position and energizing the first coil of the clutch device through the closed contact set across the battery to couple the clutch device in its driving relation with the compressor thereby to initiate its operation in the system when the thermostatic switch is in its closed position;

closing a third one of the switch elements subsequent to the closure of the another switch element so as to shunt the resistor when the thermostatic switch is in its open position;

energizing the second coil of the relay device at least at the preselected pickup voltage thereof across the battery through the closed third one switch element upon the shunting of the resistor when the thermostatic switch is in its open position and effecting closure of the contact set of the relay device in response to the energization of the second coil when the thermostatic switch is in its open position; and energizing the first coil of the clutch device across the battery through the closed contact set of the relay device when the thermostatic switch is in its open position and effecting thereby the coupling of the clutch device in its drying relation with the compressor so as to initiate its operation in the system.

* * * * *